(12) United States Patent
Gesmundo et al.

(10) Patent No.: US 12,373,694 B2
(45) Date of Patent: *Jul. 29, 2025

(54) TRAINING NEURAL NETWORK SYSTEMS TO PERFORM MULTIPLE MACHINE LEARNING TASKS

(71) Applicant: Google LLC, Mountain View, CA (US)

(72) Inventors: Andrea Gesmundo, Zurich (CH); Jeffrey Adgate Dean, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,700

(22) Filed: Mar. 14, 2024

(65) Prior Publication Data

US 2024/0370721 A1  Nov. 7, 2024

Related U.S. Application Data

(63) Continuation of application No. 18/199,901, filed on May 19, 2023, now Pat. No. 12,056,613.

(60) Provisional application No. 63/344,016, filed on May 19, 2022.

(51) Int. Cl.
*G06N 3/08* (2023.01)
(52) U.S. Cl.
CPC ..................... *G06N 3/08* (2013.01)
(58) Field of Classification Search
CPC ....................................................... G06N 3/08
See application file for complete search history.

(56) References Cited

U.S. PATENT DOCUMENTS

2020/0104687 A1* 4/2020 Gesmundo ............... G06N 3/08
2020/0380372 A1* 12/2020 Wierstra ................ G06N 3/086

OTHER PUBLICATIONS

DongDong She "MTFuzz: Fuzzing with a Multi-task Neural Network", (Year: 2020).*
Ajayan et al., "Edge to quantum: hybrid quantum-spiking neural network image classifier," Neuromorphic Computing And Engineering, Sep. 2021, 1:024001, 9 pages.
An et al., "An Ensemble Of Simple Convolutional Neural Network Models For MINIST Digit Recognition," CoRR, Submitted on Aug. 12, 2020, arXiv:2008.10400, 10 Pages.
Ba et al., "Layer Normalization," CoRR, Submitted on Jul. 21, 2016, arXiv:1607.06450, 14 Pages.
Barham et al., "Pathways: Asynchronous Distributed Dataflow For ML," CoRR, Submitted on Mar. 23, 2022, arXiv:2203.12533, 20 Pages.
Bergstra et al., "Algorithms for Hyper-Parameter Optimization," Advances In Neural Information Processing Systems 24 (NIPS 2011), Dec. 2011, 9 Pages.
Brown et al., "Language Models Are Few-Shot Learners," CoRR, Submitted on May 28, 2020, arXiv:2005.14165, 72 Pages.
Chen et al., "Gradnorm: Gradient Normalization for Adaptive Loss Balancing in Deep Multitask Networks," Proceedings Of The 35th International Conference On Machine Learning (PMLR), Jul. 2018, 80:794-803.

(Continued)

*Primary Examiner* — Van C Mang
(74) *Attorney, Agent, or Firm* — Fish & Richardson P.C.

(57) ABSTRACT

Methods, systems, and apparatus, including computer programs encoded on computer storage media, for training a neural network system to perform multiple machine learning tasks.

20 Claims, 5 Drawing Sheets

(56) References Cited

OTHER PUBLICATIONS

Cheng et al., "Remote Sensing Image Scene Classification: Benchmark And State Of The Art," CoRR, Submitted on Mar. 1, 2017, arXiv:1703.00121, 17 Pages.
Cimpoi et al., "Describing Textures in the Wild," IEEE Conference on Computer Vision and Pattern Recognition, Jun. 2014, 3606-3613.
Clanuwat et al., "Deep Learning for Classical Japanese Literature," CoRR, Submitted on Dec. 3, 2018, arXiv:1812.01718, 8 Pages.
Cohen et al., "EMNIST: Extending MNIST to handwritten letters," 2017 International Joint Conference On Neural Networks (IJCNN), May 2017, 2921-2926.
Das et al., "A genetic algorithm based region sampling for selection of local features in handwritten digit recognition application," Applied Soft Computing, May 2012, 12(5):1592-1606.
Das et al., "A statistical-topological feature combination for recognition of handwritten numerals," Applied Soft Computing, Aug. 2012, 12(8):2486-2495.
Devlin et al., "BERT: Pre-training of Deep Bidirectional Transformers for Language Understanding," Proceedings Of NAACL-HLT 2019, Jun. 2019, 4171-4186.
Dosovitskiy et al., "An Image is Worth 16x16 Words: Transformers for Image Recognition at Scale," CoRR, Submitted n Jun. 3, 2021, arXiv:2010.11929V2, 22 Pages.
Du et al., "GLaM: Efficient Scaling of Language Models with Mixture-of-Experts," CoRR, Submitted on Dec. 13, 2021, arXiv:2112.06905, 23 Pages.
Fei-Fei et al., "Learning Generative Visual Models from Few Training Examples: An Incremental Bayesian Approach Tested on 101 Object Categories," Proceedings Of The 2004 IEEE Computer Society Conference On Computer Vision And Pattern Recognition Workshops (CVPRw'04), Jun. 2004, 9 Pages.
Fernando et al., "PathNet: Evolution Channels Gradient Descent in Super Neural Networks," CoRR, Submitted on Jan. 30, 2017, arXiv:1701.08734, 16 Pages.
Foret et al., "Sharpness-Aware Minimization for Efficiently Improving Generalization," CoRR, Submitted on Apr. 29, 2021, arXiv:2010.01412v3, 20 Pages.
French, "Catastrophic forgetting in connectionist networks," Trends In Cognitive Sciences, May 1999, 3(4):128-135.
Geiger et al., "Are we ready for Autonomous Driving? The KITTI Vision Benchmark Suite," 2012 IEEE Conference On Computer Vision And Pattern Recognition, Jun. 2012, 3354-3361.
Gesmundo et al., "An Evolutionary Approach To Dynamic Introduction Of Tasks In Large-Scale Multitask Learning Systems," CoRR, Submitted On May 25, 2022, arXiv:2205.12755, 18 Pages.
Gesmundo et al., "muNet: Evolving Pretrained Deep Neural Networks into Scalable Auto-tuning Multitask Systems," CoRR, Submitted on May 22, 2022, arXiv:2205.10937, 22 Pages.
Gidaris et al., "Unsupervised Representation Learning by Predicting Image Rotations," CoRR, Submitted on Mar. 21, 2018, arXiv:1803.07728, 16 Pages.
Hazra et al., "Bangla-Meitei Mayek scripts handwritten character recognition using Convolutional Neural Network," Applied Intelligence, 2021, 51:2291-2311.
He et al., "Deep Residual Learning for Image Recognition," 2016 IEEE Conference On Computer Vision And Pattern Recognition (CVPR), Jun. 2016, 770-778.
Helber et al., "EuroSAT: A Novel Dataset and Deep Learning Benchmark for Land Use and Land Cover Classification," CoRR, Submitted On Feb. 1, 2019, arXiv:1709.00029V2, 9 Pages.
Hendrycks et al., "Bridging Nonlinearities and Stochastic Regularizers with Gaussian Error Linear Units," CoRR, Submitted on Jun. 27, 2016, arXiv:1606.08415V1, 6 Pages.
Hou et al., "Multiagent Deep Reinforcement Learning for Task Offloading and Resource Allocation in Cybertwin-Based Networks," IEEE Internet Of Things Journal, Nov. 2021, 8(22):16256-16268.

Houlsby et al., "Parameter-Efficient Transfer Learning for NLP," Proceedings Of The 36th International Conference On Machine Learning (PMLR), Jun. 2019, 97:2790-2799.
International Search Report and Written Opinion in International Appln. No. PCT/US2023/022954, mailed on Aug. 2, 2023, 16 Pages.
Jaderberg et al., "Population Based Training of Neural Networks," CoRR, Submitted on Nov. 27, 2017, arXiv:1711.09846, 21 Pages.
Jeevan et al., "Wavemix: Resource-efficient Token Mixing for Images," CoRR, Submitted on Mar. 7, 2022, arXiv:2203.03689, 12 Pages.
Johnson et al., "CLEVR: A Diagnostic Dataset for Compositional Language and Elementary Visual Reasoning," 2017 IEEE Conference On Computer Vision And Pattern Recognition (CVPR), Jul. 2017, 1988-1997.
Jouppi et al., "In-Datacenter Performance Analysis of a Tensor Processing Unit," 2017 ACM/IEEE 44th Annual International Symposium On Computer Architecture (ISCA), Jun. 2017, 12 pages.
Kabir et al., "Spinalnet: Deep Neural Network With Gradual Input," CoRR, Submitted On Jul. 7, 2020, arXiv:2007.03347, 8 Pages.
Kaggle.Com [Online], "Diabetic Retinopathy Detection," Available on or before Feb. 19, 2015, via Internet Archive: Wayback Machine URL <https://web.archive.org/web/20150219184430/Https://Www.Kaggle.Com/C/Diabetic-Retinopathy-Detection/Data>, retrieved on Nov. 28, 2023, URL<Https://Www.Kaggle.Com/C/Diabetic-Retinopathy-Detection/Data>, 2 Pages.
Kaplan et al., "Scaling Laws for Neural Language Models," CoRR, Submitted on Jan. 23, 2020, arXiv:2001.08361, 30 Pages.
Kendall et al., "Multi-Task Learning Using Uncertainty to Weigh Losses for Scene Geometry and Semantics," IEEE/CVF Conference On Computer Vision and Pattern Recognition, Jun. 2018, 7482-7491.
Klindt et al., "Towards Nonlinear Disentanglement in Natural Data with Temporal Sparse Coding," CoRR, Submitted on Mar. 17, 2021, arXiv:2007.10930v2, 51 Pages.
Krizhevsky et al., "Learning Multiple Layers of Features from Tiny Images," University Of Toronto Technical Report Tr-2009, 2009, 60 Pages.
Lake et al., "Lake et al., "Human-Level Concept Learning Through Probabilistic Program Induction," Science, Dec. 2015, 1332-1338," Science, Dec. 2015, 1332-1338.
Lecun et al., "Gradient-based learning applied to document recognition," Proceedings of the IEEE, Nov. 1998, 86:2278-2324.
Lecun et al., "Learning methods for generic object recognition with invariance to pose and lighting," Proceedings of the 2004 IEEE Computer Society Conference on Computer Vision and Pattern Recognition, Jul. 2004, 8 Pages.
Liu et al., "Darts: Differentiable Architecture Search," CoRR, Submitted On Apr. 23, 2019, arXiv:1806.09055V2, 13 Pages.
Liu et al., "Loss-Balanced Task Weighting to Reduce Negative Transfer in Multi-Task Learning," The Thirty-Third AAAI Conference on Artificial Intelligence (AAAI-19), Feb. 2019, 9977-9978.
Ma, "NASA: Accelerating Neural Network Design with a NAS Processor," IEEE, 2023 (Year: 2021).
Maziarz et al., "Evolutionary-Neural Hybrid Agents for Architecture Search," CoRR, Submitted on Nov. 24, 2018, arXiv:1811.09828, 13 Pages.
McCloskey et al., "Catastrophic Interference in Connectionist Networks: The Sequential Learning Problem," Psychology Of Learning And Motivation, 1989, 24:109-165.
Mensink et al., "Factors of Influence for Transfer Learning across Diverse Appearance Domains and Task Types," CoRR, Submitted on Mar. 24, 2021, arXiv:2103.13318v1, 21 Pages.
Mirhoseini et al., "Chip Placement with Deep Reinforcement Learning," CoRR, submitted on Apr. 22, 2020, arXiv:2004.10746, 15 Pages.
Morgado et al., "NetTailor: Tuning the Architecture, Not Just the Weights," 2019 IEEE/CVF Conference on Computer Vision And Pattern Recognition (CVPR), Jun. 2019, 3039-3049.
Netzer et al., "Reading Digits in Natural Images with Unsupervised Feature Learning, " Proceedings of the NIPS Workshop on Deep Learning and Unsupervised Feature Learning 2011, Dec. 2011, 9 Pages.

(56) References Cited

OTHER PUBLICATIONS

Nilsback et al., "Automated Flower Classification over a Large Number of Classes," 2008 Sixth Indian Conference on Computer Vision, Graphics & Image Processing, Dec. 2008, 8 Pages.
Parkhi et al., "Cats and dogs," 2012 IEEE Conference on Computer Vision and Pattern Recognition, Jun. 2012, 8 Pages.
Pham et al., "Efficient Neural Architecture Search via Parameters Sharing," Proceedings of the 35th International Conference on Machine Learning (PMRL), 80, Jul. 2018, 80:4095-4104.
Raffel et al., "Exploring the Limits of Transfer Learning with a Unified Text-to-Text Transformer," CoRR, Submitted on Jul. 28, 2020, arXiv:1910.10683V3, 67 Pages.
Ramesh et al., "Zero-Shot Text-To-Image Generation," CoRR, Submitted On Feb. 24, 2021, arXiv:2102.12092, 20 Pages.
Real et al., "Regularized Evolution for Image Classifier Architecture Search," The Thirty-Third AAAI Conference on Artificial Intelligence (AAAI-19), Feb. 2019, 4780-4789.
Rebuffi et al., "Learning multiple visual domains with residual adapters," Proceedings of the 31st International Conference on Neural Information Processing Systems (NIPS 2017), Dec. 2017, 11 Pages.
Ren et al., "A Comprehensive Survey of Neural Architecture Search: Challenges and Solutions," CoRR, Submitted on Mar. 2, 2021, arXiv:2006.02903, 33 Pages.
Ridnik et al., "ML-Decoder: Scalable and Versatile Classification Head," CoRR, Submitted on Nov. 25, 2021, arXiv:2111.12933, 14 pages.
Robots.Ox.Ac.Uk [Online], "Visual Domain Decathlon," Available On Or Before Jul. 17, 2017, Via Internet Archive: Wayback Machine URL<Http://Web.Archive.Org/Web/20170717090549/Http://Www.Robots.Ox.Ac.Uk:80/~Vgg/Decathlon/>, retrieved on Nov. 28, 2023, URL<Http://Www.Robots.Ox.Ac.Uk:80/~Vgg/Decathlon/>, 5 Pages.
Rosenbaum et al., "Routing Networks: Adaptive Selection of Non-linear Functions for Multi-Task Learning," CoRR, Submitted on Nov. 3, 2017, arXiv:1711.01239V2, 16 Pages.
Rosenfeld et al., "Incremental Learning Through Deep Adaptation," CoRR, Submitted on May 11, 2017, arXiv: 1705.04228V1, 10 Pages.
Rosenstein et al., "To Transfer or Not To Transfer," Advances In Neural Information Processing Systems, 2005, 4 Pages.
Russakovsky et al., "Imagenet Large Scale Visual Recognition Challenge," International Journal of Computer Vision, Apr. 2015, 115:211-252.
Rusu et al., "Progressive Neural Networks," CoRR, Submitted on Jun. 15, 2016, arXiv:1606.04671, 12 Pages.
Sener et al., "Multi-Task Learning as Multi-Objective Optimization," Advances in Neural Information Processing Systems 31 (NeurIPS 2018), Dec. 2018, 12 Pages.
Senior et al., "Improved Protein Structure Prediction Using Potentials From Deep Learning," nature, 2020, 577:706-710.
Shazeer et al., "Outrageously Large Neural Networks: The Sparsely-Gated Mixture-Of-Experts Layer," CoRR, Submitted on Jan. 23, 2017, arXiv:1701.06538, 19 Pages.
Silver et al., "Mastering the game of Go with deep neural networks and tree search," Nature, 2016, 529:484-489.
Snoek et al., "Practical Bayesian Optimization of Machine Learning Algorithms," Advances In Neural Information Processing Systems 25 (NIPS 2012), Dec. 2012, 9 Pages.
Srinivas et al., "Gaussian Process Optimization in the Bandit Setting: No Regret and Experimental Design," Proceedings of the 27th International Conference on Machine Learning, Jun. 2010, 8 Pages.
Steiner et al., "How to train your ViT? Data, Augmentation, and Regularization in Vision Transformers," CoRR, Submitted on Jun. 18, 2021, arXiv:2106.10270, 14 Pages.
Sun et al., "ERNIE 2.0: A Continual Pre-training Framework for Language Understanding," CoRR, Submitted on Jul. 29, 2019, arXiv:1907.12412v1, 11 Pages.
Tan et al., "Mnasnet: Platform-Aware Neural Architecture Search for Mobile," 2019 IEEE/CVF Conference on Computer Vision and Pattern Recognition (CVPR), Jun. 2019, 2815-2823.
Touvron et al., "Going Deeper With Image Transformers," 2021 IEEE/CVF International Conference On Computer Vision (ICCV), Oct. 2021, 32-42.
Vaswani et al., "Attention Is All You Need," CoRR, Submitted on Jun. 12, 2017, arXiv:1706.03762, 15 Pages.
Veeling et al., "Rotation Equivariant CNNs for Digital Pathology," CoRR, Submitted on Jun. 8, 2018, arXiv:1806.03962, 8 Pages.
Vinyals et al., "Grandmaster level in StarCraft II using multi-agent reinforcement learning," nature, Nov. 2019, 575:350-354.
Wang et al., "Characterizing and Avoiding Negative Transfer," 2019 IEEE/CVF Conference on Computer Vision and Pattern Recognition (CVPR), Jun. 2019, 11293-11302.
Xiao et al., "SUN database: Large-scale scene recognition from abbey to zoo," 2010 IEEE Computer Society Conference on Computer Vision and Pattern Recognition, Jun. 2010, 8 Pages.
Yu et al., "Gradient Surgery for Multi-Task Learning," CoRR, Submitted on Jan. 19, 2020, arXiv:2001.06782, 18 Pages.
Zhai et al., "A Large-scale Study of Representation Learning with the Visual Task Adaptation Benchmark," CoRR, Submitted on Oct. 1, 2019, arXiv:1910.04867v2, 33 Pages.
Zhai et al., "The Visual Task Adaptation Benchmark," CoRR, Submitted on Oct. 1, 2019, arXiv:1910.04867v1, 35 Pages.
Zhang et al., "A Survey on Negative Transfer," CoRR, Submitted on Jul. 9, 2021, arXiv:2009.00909v3, 15 Pages.
Zhang et al., "Evolutionary Computation Meets Machine Learning: A Survey," IEEE Computational Intelligence Magazine, Nov. 2011, 6(4):68-75.
Zoph et al., "Neural Architecture Search with Reinforcement Learning," CoRR, Submitted on Feb. 15, 2017, arXiv:1611.01578v2, 16 Pages.
International Preliminary Report on Patentability in International Appln. No. PCT/US2023/022954, mailed on Nov. 28, 2024, 10 pages.

* cited by examiner

TRAINING NEURAL NETWORK SYSTEMS TO PERFORM MULTIPLE MACHINE LEARNING TASKS

CROSS-REFERENCE TO RELATED APPLICATIONS

This is a continuation of U.S. application Ser. No. 18/199,901, filed on May 19, 2023, which claims priority to U.S. Provisional Application No. 63/344,016, filed on May 19, 2022. The disclosures of the prior applications are considered part of and are incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that trains a neural network system to perform multiple different machine learning tasks. This specification also describes a system for executing such a neural network system at inference time.

Particular embodiments of the subject matter described in this specification can be implemented so as to realize one or more of the following advantages.

Using techniques described in this specification, a system can train a single neural network system to perform multiple different machine learning tasks. In some implementations, even after the neural network system has been trained (and, in some cases, deployed) for a first set of tasks, a system can further train the neural network system for new tasks for which the neural network system has not yet been trained.

In some implementations, as the neural network system is trained for new tasks, the number of additional network parameters required to learn the new task can decrease because the neural network system is able to leverage knowledge encoded in existing network parameters when learning previous tasks. Instead or in addition, the time it takes to train the neural network system for new tasks, and/or the computational cost of training for new tasks, can decrease because of the information already encoded in the neural network system when learning the previous tasks.

In some implementations, the operations for training the neural network system to perform a new task can be parallelized, e.g., across different threads or cores of a parallel processing device, or across different devices in a computer system. For example, a system can train multiple "candidate" neural networks to perform the new task (where the candidate neural network can share some parameters with the existing networks of the neural network system) in parallel, and then select one or more of the trained candidate neural network for inclusion in the neural network system based on the performance of the trained candidate neural networks. Instead or in addition, the operations for training the neural network system to perform respective different tasks can be parallelized, e.g., by training candidate neural networks to perform the different tasks on respective different threads, cores, or devices.

Similarly, in some implementations, the operations for performing an inference step using the trained neural network system can be parallelized. For example, respective network blocks of respective neural networks of the neural network system can be assigned to respective different computing nodes in a distributed system of computing nodes.

In some implementations described herein, a training system can dynamically incorporate new tasks into the neural network system, including adding new network parameters to the neural network system for performing the new tasks. However, because the neural network system is sparse, i.e., given a particular network input only a portion of the network parameters of the neural network system are activated (in some cases, a small portion, e.g., 10%, 1%, or 0.01%), adding new network parameters can have no or minimal effect on the latency, computational cost, and/or energy consumption of the neural network system when processing a network input. That is, the training system can encode new information into the neural network, providing additional capabilities, without reducing the efficiency of the neural network system at inference time.

Using techniques described in this specification, a neural network system can be trained to perform multiple different tasks without suffering from "catastrophic forgetting," where a network is trained for a first task and then updated for a second task, and after the network is updated it is no longer able to achieve acceptable performance when performing the first task (i.e., the network "forgets" information encoded during the training for the first task). By "freezing" the existing neural networks of the neural network system when adding new neural networks for new tasks (i.e., not updating the network parameters of the existing neural networks when training the new neural networks, even when the existing and new neural networks share parameters), a training system can ensure that there is no degradation of the performance of the existing neural networks. That is, the knowledge encoded in the trained neural networks of the neural network system is always preserved.

Using techniques described in this specification, a neural network system can be trained to perform multiple different tasks without suffering from "negative transfer," where leveraging knowledge learned when training for a first task reduces the performance of the neural network system when training for a second task. By leveraging the "evolutionary" techniques described herein, where a training system trains multiple candidate neural networks that share respective different subsets of the existing parameters of the neural network system, the training system can identify which particular existing network parameters are useful when training for a new task, and can thus retain only the candidate neural networks that leverage the information encoded in the particular existing network parameters (and can, e.g., discard the candidate neural networks that do suffer from negative transfer).

Using techniques described in this specification, a neural network system can be trained to perform multiple different tasks without suffering from gradient interference, where multiple different gradient updates are applied synchronously to the same set of network parameters, undermining the efficacy of each individual gradient update. In some implementations described herein, although respective different candidate neural networks can be trained in parallel, for a particular candidate neural network, only a single gradient update is applied at any given time. That is, instead of concurrently updating the network parameters of the neural network system for multiple different tasks, respective candidate neural networks can be added to the neural network system for each individual task, where the addition of a candidate neural network does not affect the operation of any other neural network in the neural network system.

In some implementations described in this specification, a neural network system can identify one or more of the neural networks as "secure" neural networks. A secure neural network is a neural network that is not included in the pool of neural networks from which the parent neural networks to respective candidate neural networks are selected. Thus, the information encoded in the secure neural networks can be secure against accessing by another system, e.g., a training system when adding a new task to the neural network system or an inference system making an inference call to a different neural network in the neural network system. For example, any network blocks that were updated during the training of the secure neural network (i.e., any network blocks that were not shared and thus frozen during the training) can be withheld from being shared with any other neural network in the neural network system, again ensuring the security of the information encoded in the secure network block. As a particular example, a private (e.g., proprietary) data set can be used to train the secure neural network, and so any network updates generated using the private data set can be ensured to only encode information in the secure neural network, and not any other neural network through a shared network block. Thus, the designation of a neural network as "secure" by the neural network can ensure the security and privacy of the information of the neural network.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a neural network system to perform multiple different machine learning tasks.

This specification also describes a system for executing such a neural network system at inference time.

Figure 1:
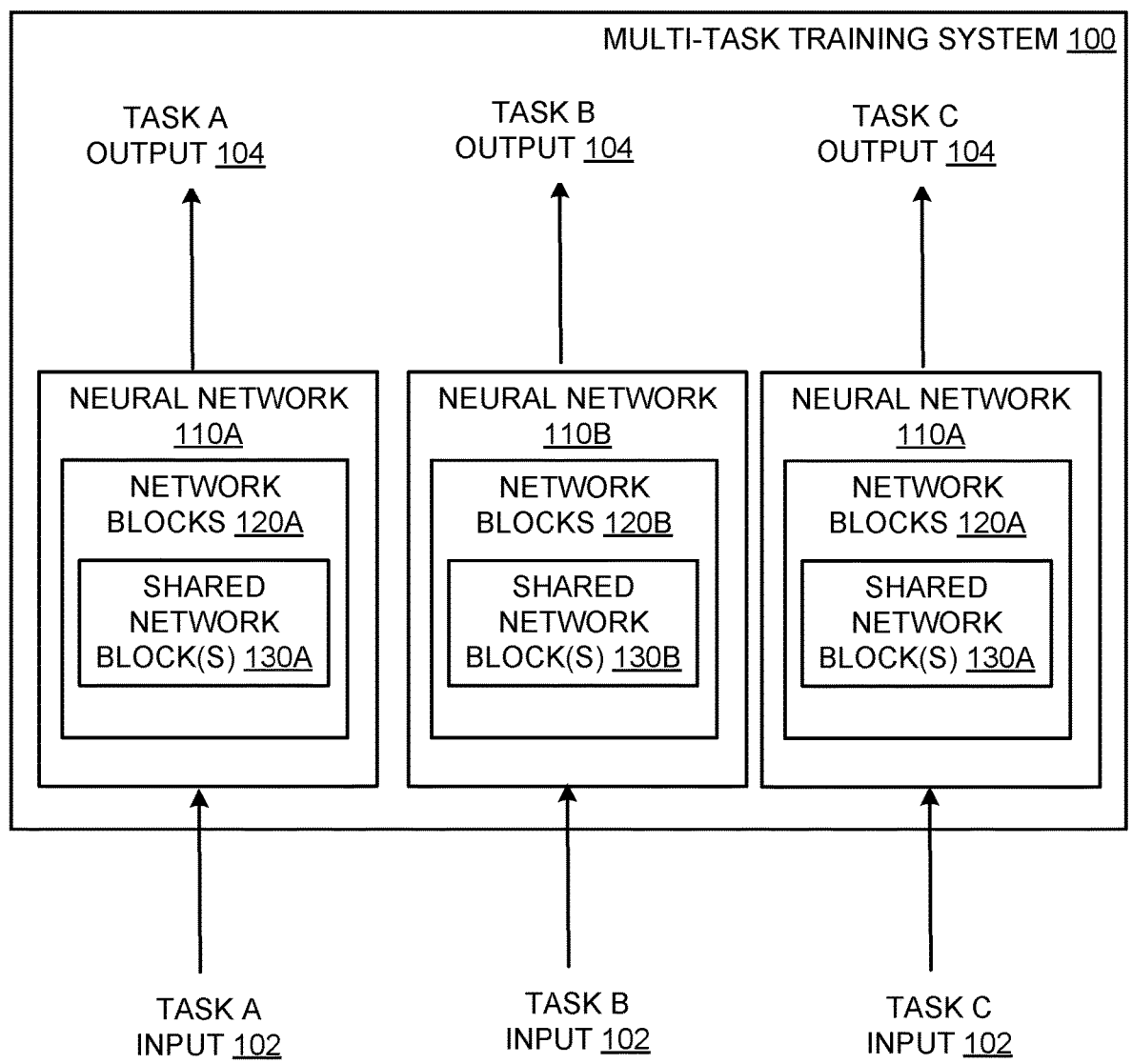
FIG. 1 shows an example multi-task training system.

FIG. 1 shows an example multi-task training system 100 that trains a neural network system 150 that can perform multiple different machine learning tasks.

The multi-task training system 100 is an example of a system implemented as computer programs on one or more computers in one or more locations, in which the systems, components, and techniques described below can be implemented.

After the training, the multi-task system 100 or a different inference system uses the trained neural network system 150 to perform the multiple different machine learning tasks.

In particular, after the neural network system 150 has been trained, the neural network system 150 can include multiple different neural networks 110A-C that are each configured to perform a respective one of the multiple machine learning tasks for which the neural network system is configured.

While only three different neural networks 110A-C for three tasks A-C are shown in FIG. 1, in practice the neural network system 150 can include many more neural networks for many more tasks. In some cases, the neural network system 150 can include more than one neural network for one or more of the tasks.

Each neural network 110A-C of the neural network system 150 can include a set of multiple network blocks 120A-C.

Each network block 120A-C can, in turn, include one or more neural network layers. More specifically, a "network block," as used in this specification, is a collection of one or more neural network layers that receive an input ("a block input") and process the input to generate an output (a "block output").

Each neural network 110A-C of the neural network system 150 can include neural network layers of any appropriate type for performing the corresponding machine learning task.

For example, the neural networks 110A-C of the neural network system 150 can include feedforward neural network layers, convolutional neural network layers, recurrent neural network layers, and/or self-attention neural network layers.

Example machine learning tasks which the neural networks 110A-C in the neural network system 150 can be configured to perform are discussed below.

Each neural network 110A-C of the neural network system 150 can share at least one respective network block 130A-C with one or more other neural networks 110A-C of the neural network system.

In this specification, a particular network block is "shared" between two neural networks if both neural networks include a network block that has the same architecture and the same network parameters as the particular network block.

In some implementations, the respective shared network block 130A-C of both neural networks is implemented on a respective different computing node (e.g., on a respective different device, or on a respective different thread or core of a device). That is, the two neural networks can both include respective "copies" of the shared network block that are executed separately.

In some other implementations, the system 100 includes a single computing node that executes the operations of the shared network block 130A-C. That is, there is a single "copy" of the shared network block 130A-C to which both neural networks can send requests for processing respective block inputs to generate respective block outputs.

The training system 100 can, at each of multiple stages corresponding to a respective task (called an "active" task herein), train the neural network system 150 to perform the active task by adding one or more new neural networks to the current set of neural networks 110A-C of the neural network system 150.

That is, at each stage, the neural network system 150 includes a current set of neural networks 110A-C that have been added at respective preceding stages, and the training system 150 can add one or more additional neural networks for performing the active task as a result of performing the stage.

Before the first stage, i.e., before the training system 150 has trained any neural networks, the current set of neural networks can be initialized to include one or more randomly-initialized or pre-trained neural networks. For example, the current set can be initialized to have a single, high-performing root neural network, e.g., a Vision Transformer, a convolutional neural network, e.g., a ResNet, an encoder-decoder Transformer, e.g., a T5 Transformer, and so on. The parameters of the root neural network can be randomly-initialized or pre-trained, e.g., through supervised learning, unsupervised learning, or both on a large data set.

Performing a stage of the training process is described in more detail below.

By repeatedly performing stages of training, the training process 150 can expand the neural networks that are available for use at inference, e.g., by adding new neural networks that can perform new tasks, by adding new neural networks that perform the same task as an existing neural network, or both.

Generally, the multi-task system 100 or the inference system can perform inference using the neural networks 110A-C that are in the neural network system 150 at any given point during the training, after all of the stages of training are completed, or both, e.g., process respective inputs 102A-C for the tasks A-C using the corresponding neural networks 110A-C to generate respective outputs 104A-C for the tasks A-C. For example, the system 100 or the inference system can perform inference in parallel with the training system 150 performing a stage to add an additional neural network to the neural networks in the neural network system 150.

Thus, the system 100 can implement a "continual learning" scheme, where new neural networks for new tasks can be continually added to the available neural networks while leveraging information encoded in the available neural networks, and without degrading the performance of the available neural networks.

As described above, each neural network in the neural network system 150 can be configured to process network inputs of any appropriate type and to perform any appropriate machine learning task, e.g., a classification task, a regression task, or a combination thereof. In some implementations, each neural network in the neural network system is configured to process a same type of network input, e.g., input images or input text. That is, each of the multiple tasks can require processing the same type of network input.

In some other implementations, different neural networks in the neural network system can be configured to process respective different network inputs. That is, two or more of the multiple tasks require processing different types of network inputs from one another.

A few example network inputs and machine learning tasks are discussed below.

For example, the network input can represent an input image, and the machine learning task may be an image processing task. The neural network can be configured to process images of any appropriate type, e.g., RGB images, LIDAR images (e.g., point clouds), and so on. The system can divide the image into multiple different image patches, where each image patch includes a different subset of the pixels of the image. The input elements of the input sequence can thus represent respective image patches of the input image. In this specification, processing an image refers to processing the intensity values of the pixels of the image.

As a particular example, the neural network can be configured to generate a classification output that includes a respective score corresponding to each of multiple categories. The score for a category indicates a likelihood that the network input belongs to the category. In some cases, the categories may be classes of objects (e.g., dog, cat, person, and the like), and the network input may belong to a category if it represents an object included in the object class corresponding to the category. In some cases, the categories may represent global properties (e.g., whether the network input represents an environment in the day or at night, or whether the network input represents an environment in the summer or the winter), and the network input may belong to the category if it has the global property corresponding to the category.

As another particular example, the neural network can be configured to generate an element-level classification output (e.g., a pixel-level classification output for an RGB image or a point-level classification output for a LIDAR image) that includes, for each element in the network input, a respective score corresponding to each of multiple categories. For a given element (e.g., for a given pixel or point), the score for a category indicates a likelihood that element belongs to the category. In some cases, the categories may be classes of objects, and an element may belong to a category if it is part on an object included in the object class corresponding to the category. That is, the element-level classification output may be semantic segmentation output.

As another particular example, the neural network can be configured to generate a regression output that estimates one or more continuous variables (i.e., that can assume infinitely many possible numerical values) that characterize the network input. In a particular example, if the network input represents an image, the regression output may estimate the coordinates of bounding boxes that enclose respective objects depicted in the image. The coordinates of a bounding box may be defined by (x, y) coordinates of the vertices of the bounding box.

As another example, the network input can represent a sequence of audio data, and the machine learning task may be a speech recognition task, where the neural network is configured to process a representation of an audio waveform to generate an output that characterizes a sequence of phonemes, characters, or words corresponding to the audio waveform.

As another example, the network input can represent a sequence of video frames, and the machine learning task may be a video analysis task, where the neural network is configured to process a sequence of video frames to generate an output that characterizes the video frames, e.g., by characterizing whether the video frames depict a person performing a particular action.

As another example, the network input can represent a sequence of text data, and the machine learning task may be a natural language processing task, where the neural network is configured to process a portion of text to generate an output that characterizes the portion of text, e.g., by characterizing a translation of the portion of text into a different natural language.

As a particular example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another particular example, the task can be a text generation task, where the input is a sequence of text, and the output is another sequence of text, e.g., a completion of the input sequence of text, a response to a question posed in the input sequence, or a sequence of text that is about a topic specified by the first sequence of text. For instance, the neural network can be an autoregressive neural network, e.g., a self-attention based autoregressive neural network. As another example, the input to the text generation task can be an input other than text, e.g., an image, and the output sequence can be text that describes the input.

Figure 2:
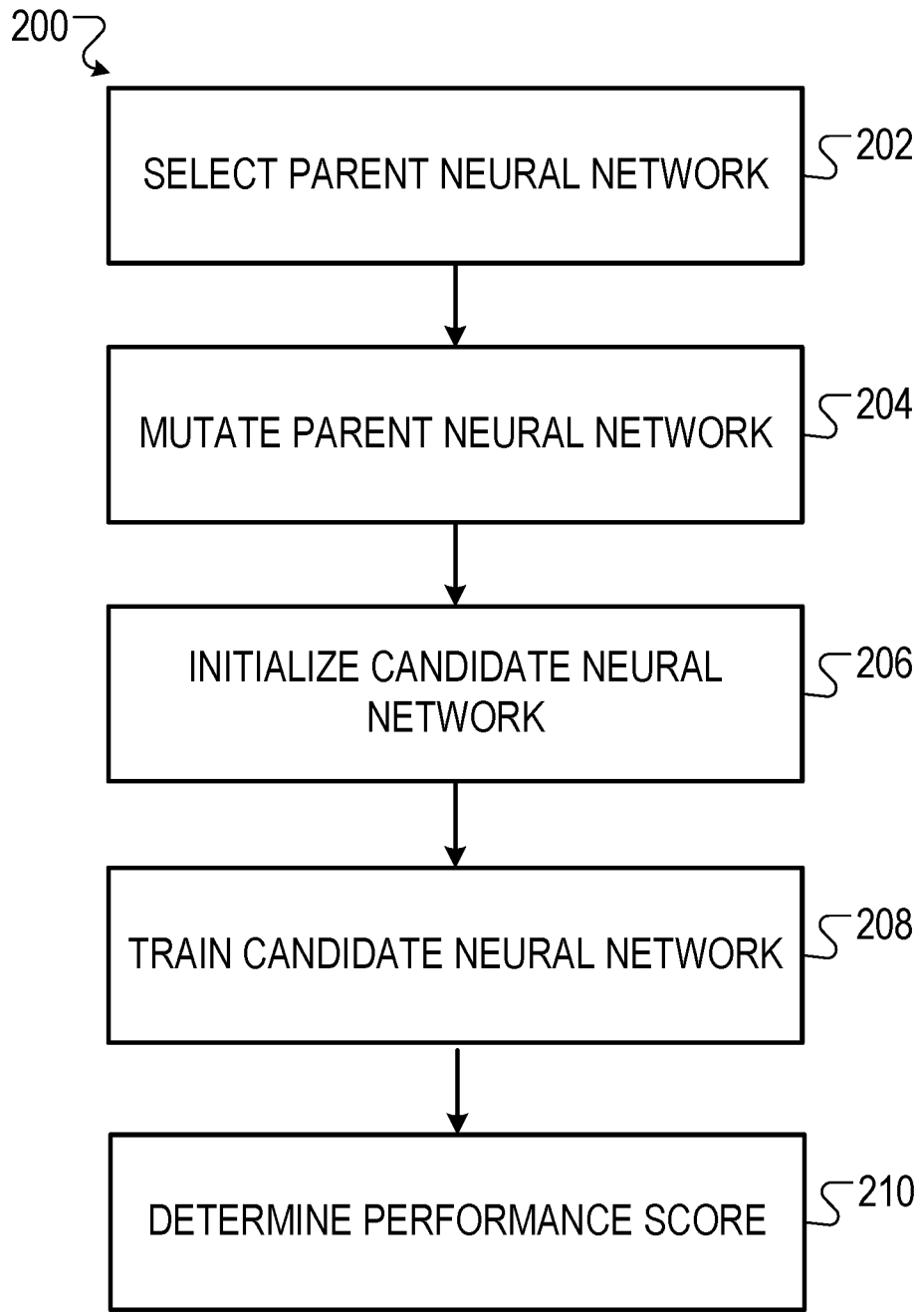
FIG. 2 is a flow diagram of an example process for performing a training stage.

FIG. 2 is a flow diagram of an example process 200 for performing a training stage during the training of a neural network system. For convenience, the process 200 will be described as being performed by a system of one or more computers located in one or more locations. For example, a training system, e.g., the training system 100 of FIG. 1, appropriately programmed, can perform the process 200.

As described above, the system can, at each of multiple stages corresponding to a respective task (called an "active" task herein), train the neural network system to perform the active task by adding one or more new neural networks to a current set of neural networks of the neural network system.

That is, at each stage, the neural network system includes a current set of neural networks that have been added at respective preceding stages, and, by performing the stage, the training system can add one or more additional neural networks for performing the active task.

In some implementations, the training system can perform multiple different stages for the same active task. That is, at a first stage, the training system can add a new neural network to the neural network system for performing the active task, and at a second stage, the training system can add another new neural network to the neural network system for performing the active task (optionally removing the neural network added at the first stage).

At each stage, the system can train multiple candidate neural networks by performing steps 202-212 for each candidate neural network.

To train a candidate neural network, the system can select a "parent" neural network for the candidate, e.g., from the current set of neural networks of the neural network system or from the candidate neural networks already trained at the current stage (step 202).

An example technique for selecting a parent neural network is described in more detail below with reference to FIG. 3.

The system then "mutates" the parent neural network to generate the candidate neural network (step 204).

That is, the candidate neural network will have an architecture, hyperparameters, or both that are a modification of the architecture, hyperparameters, or both of the parent neural network.

However, as part of generating the candidate neural network, the system does not modify the architecture or the parent neural network. That is, although the parent neural network and the candidate neural network will share one or more network blocks, the shared network blocks will not be updated during the training of the candidate neural network. That is, only network blocks that are not shared with the parent neural network will be updated during the training of the candidate neural network.

A specific example of mutating the parent neural network to generate the candidate neural network will be described next.

The system identifies a first strict subset of the network blocks of the parent neural network (step 204). That is, the subset is a strict subset because it includes less than all of the network blocks of the parent neural network.

Copies of the network blocks in the first strict subset are to be updated during training of the candidate neural network.

That is, during training of a candidate neural network, the network parameters of the parent neural network are not updated (i.e., are "frozen") so the system copies the architecture and parameter values of the first strict subset of the network blocks to generate a copy that can be updated during the training of the candidate neural network.

The training system can further identify a second strict subset of the network blocks of the parent neural network that are to be shared between the parent neural network and the candidate neural network in the neural network system.

In some implementations, the second strict subset includes all of the network blocks of the parent neural network that are not in the first strict subset. That is, any block that is not to be copied is shared between the parent and the candidate.

In some other implementations, the system can further identify a third strict subset of the network blocks of the parent neural network to remove from the candidate neural network.

Again, the parent neural network remains constant during the training of the candidate neural network, so to "remove" a network block in the third strict subset from the candidate neural network, the system can add connections between the preceding network block in the candidate neural network and the following network block in the candidate neural network (i.e., connections by which block outputs of the preceding network block will be provided as block inputs to the following network block).

In these implementations, the second strict subset includes all of the network blocks of the parent neural network that are not in the first strict subset and not in the third strict subset.

In some implementations, the training system can further add one or more new network blocks to the candidate neural network that were not in the parent neural network.

Instead or in addition to mutating the architecture of the parent, the training system can modify a set of hyperparameters for the training of the candidate neural network relative to the hyperparameters used to train the parent neural network.

An example of mutating the parent is described in more detail below with reference to FIG. 4.

The system can initialize the candidate neural network (step 206).

As part of initializing the candidate neural network, the system generates a copy of each network block in the first strict subset and includes the copied network block in the architecture of the candidate neural network.

The system also includes in the architecture, a shared block corresponding to each block in the second strict subset of the parent blocks.

In some implementations, each respective shared network block that is shared between both neural networks is implemented on a respective different computing node (e.g., on a respective different device, or on a respective different thread or core of a device). That is, the two neural networks can both include respective "copies" of the shared network block that are executed separately. In these cases, the system prevents the parameter values of the copy of the shared block that corresponds to the candidate neural network from being modified during the training of the candidate neural network.

In some other implementations, the system includes a single computing node that executes the operations of any given shared network block. That is, there is a single "copy" of the shared network block to which both neural networks can send requests for processing respective block inputs to generate respective block outputs. In these cases, the system prevents the parameter values of the shared block from being modified during the training of the candidate neural network.

When one or more new network blocks were added to the candidate neural network, the system also adds the new network blocks to the candidate architecture.

In some implementations, the system also adds an output head network block to each candidate neural network that receives the output of the last network block in the candidate architecture and maps the output to the dimensionality required for the active task. This output head network block can be designated as trainable to allow the neural network to map internal representations to the output for the task. That is, in these implementations, the system automatically replaces the output head network block of the parent with a new, trainable output head network block that is specific to the active task.

The system can then train the initialized candidate neural network for the active task (step 208), i.e., by generating trained values for a set of network parameters of the candidate neural network using training data corresponding to the active task.

This can include updating a respective set of parameters of each of the first subset of network blocks, e.g., using backpropagation and gradient descent according to an error of the candidate neural network on the training data, and of any new network blocks that were added. The shared network blocks are not updated and are held frozen during this training.

After training, the system can then determine a performance score for the trained candidate neural network (step 210).

The performance score characterizes at least a performance of the trained candidate neural network on the active task, e.g., a validation accuracy, testing accuracy, precision, and/or recall.

Optionally, the performance score can further characterize an efficiency of the trained candidate neural network while performing the active task or while being trained for the active task.

For example, the performance score can be generated from or otherwise encode information about a latency of the candidate network when performing the active tasks; a number of training examples or iterations, and/or an amount of time required to train the candidate neural network to perform the active task; number of network parameters of the candidate neural network, e.g., weighted according to an extent to which the network parameters are shared with other neural networks in the neural network system; a measure of the energy consumption of the candidate neural network at inference or training; and the like.

Thus, by incorporating information about not only the quality of the predictions generated by the candidate neural network but also the efficiency of the candidate neural network when making predictions, the system can balance a performance/cost (e.g., computational or energy cost) tradeoff.

That is, the system can calibrate the performance score to encourage the candidate neural networks that are selected according to the performance scores to have the desired qualities. This tradeoff can be different for different candidate neural networks depending on the requirements of the system.

For example, if the neural network system is to be deployed in a resource-constrained environment, e.g., on an edge device such as a mobile phone or tablet, then the training system can select a performance measure in order to encourage relatively efficient networks.

As another example, if marginal improvements to the quality of the network outputs of the neural network system are more important than efficiency concerns, then the training system can select a performance measure in order to encourage relatively high-performing networks.

Optionally, the formulation of the performance scores can be updated dynamically during the training of the neural network system; e.g., if there is a temporary shortage of a certain resource on the horizon (e.g., in the next few hours or days), then the performance score can be modified to allow for the training or multi-task system to use that resource more efficiently for the limited time.

In some implementations, in addition to computing the performance score at the end of training, the system can also compute performance scores at certain checkpoints during the training, e.g., after every training epoch. In these implementations, the system can designate, as the trained candidate neural network, the version of the candidate neural network that resulted in the best performance score being computed, i.e., so that when the candidate neural network achieved a better performance score at some intermediate checkpoint than after training is complete, the candidate neural network as of the intermediate checkpoint is used as the trained neural network rather than the candidate neural network after the training is complete.

Some specific examples of performance scores will now be described.

As one example, the performance score for each trained candidate neural network m can include a term that is inversely proportional to:

$$\#\text{accounted-params}(m) = \sum_{p \in P(m)} \frac{1}{\#\text{models}(p) + 1}$$

where P(m) identifies the plurality of network parameters of the trained candidate neural network, and #models(p) identifies, for network parameter p, a number of neural networks from the current set of neural networks that include the network parameter p, i.e., that have the same value for the same network parameter of the same shared network block. In some cases where the current set of neural networks can include multiple models that perform the same task, the system can count only neural networks that perform a different task from the active task when computing #models(p).

As a specific example, the performance score for each trained candidate neural network m can be equal to or proportional to:

$$\text{score}(m) = q(m) * s^{\left(\frac{\#\text{accounted-params}(m)}{\#\text{root-model-params}}\right)}$$

where q(m) identifies a validation or testing accuracy of the trained candidate neural network, s is a hyperparameter of the neural network system and represents a scaling factor for the impact of the size of the model, and #root-model-params identifies a number of network parameters in a root neural network that was included in the current set of neural networks before a first stage of the plurality of stages, i.e., that was used to initialize the current set of neural networks.

Thus, the scaling factor, s, allows to control the size of the generated multitask model, i.e., the total size of the neural networks in the neural network system, and achieve different quality/size trade-offs.

After performing steps 202-210 for each of the multiple candidate neural networks, the system can determine that the stage has been completed.

In some implementations, the system performs steps 202-210 in parallel for each of the multiple candidate neural networks, i.e., all of the candidate neural networks for the stage are trained in parallel. For example, the system can dedicate a respective set of hardware accelerators for the training of each of the multiple candidate neural networks.

In some other implementations, the system performs the training for the stage across multiple "generations," with the candidates within each generation being trained in parallel.

Performing the training across multiple generations is described in more detail below with reference to FIG. 5.

Once the stage has been completed, the system can then select, using the respective performance scores of the candidate neural networks, one or more candidate neural networks to be added to the current set of neural networks of the neural network system (step 214).

In some implementations, the system adds only a single candidate neural network for each stage. In these implementations, the system can add only the candidate neural network with the highest performance score.

After completion of a given stage, i.e., after the final candidate neural network has been added to the neural network system at a final or after a given intermediate stage, the neural network system that includes the neural networks as of the completion of the given stage can be deployed in an inference environment, e.g., on a distributed computing system including multiple processing devices, e.g., parallel processing devices such as graphics processing units (GPUs) and/or tensor processing units (TPUs). That is, the execution of the trained neural network system can be parallelized, e.g., across multiple devices and/or across multiple threads or cores of a device.

In some cases, after the stage has been completed, and in response to selecting a particular candidate neural network to be added to the current set of neural network, the system can determine whether there are already any neural networks in the current set of neural networks that are configured to perform the active task and, if so, determine whether to remove any of the neural networks in the current set.

In particular, the system can determine whether there are any neural networks in the current set that (i) have been trained to perform the active task and (ii) have a performance score lower than the particular candidate neural network. If any neural networks in the current set satisfy both (i) and (ii), the system can remove these neural networks from the neural network system, effectively replacing the removed neural networks with the particular candidate neural network.

In some implementations, the system can designate certain ones of the neural networks in the current set of neural networks as "secured neural networks." A secured neural network is one that is in the current set of neural networks (and therefore can be used to perform inference) but that is not included in a pool of neural networks, determined from the current set, from which the parent neural networks to respective candidate neural networks are selected.

Thus, as a result from not including the secured neural networks in this pool, for each secured neural network and for each network block of the secured neural network whose parameters were updated during the training of the secured neural network, the network block is not shared with any other neural network in the neural network system. That is, while the secured neural network may share network blocks with the parent of the secured neural network that were held frozen during the training of the secured neural network, none of the network blocks of the secured neural network that were copied (and therefore updated during training) are shared with any other neural network.

For example, the system can designate a given neural network as secured because the neural network has been trained on a private data set that is not available during training of any other candidate neural network.

Figure 3:
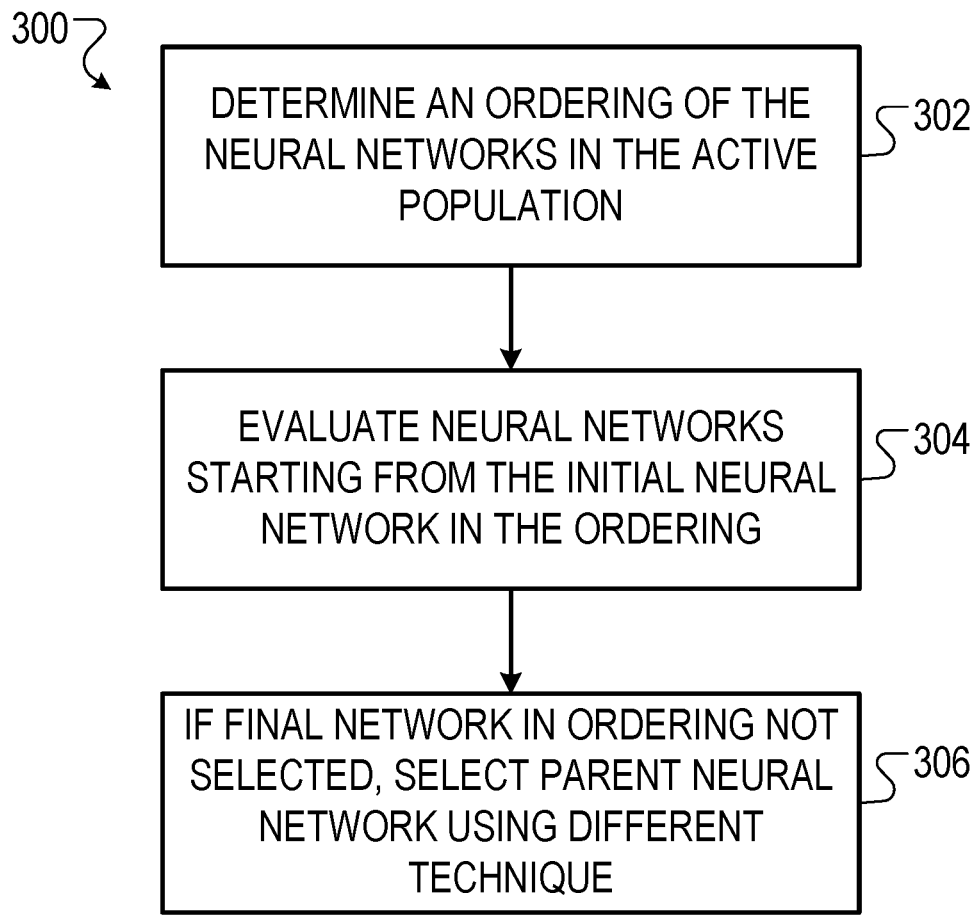
FIG. 3 is a flow diagram of an example process for selecting a parent for a given candidate neural network.

FIG. 3 is a flow diagram of an example process 300 for selecting a parent neural network for a given candidate neural network. For convenience, the process 300 will be described as being performed by a system of one or more computers located in one or more locations. For example, a multi-task training system, e.g., the multi-task training system 100 of FIG. 1, appropriately programmed, can perform the process 300.

Generally, during the stage, the system maintains an active population of neural networks that can be used as parent neural networks during the stage. In some cases, the system initializes the active population to the empty set. In some other cases, the system initializes the active population to include any neural networks in the current set that have already been trained to perform the active task and, if no neural networks have been trained to perform the active task, the system initializes the active population to the empty set.

In some implementations, at the beginning of the stage, the system initializes a set of seed neural networks for the stage.

The set of seed neural networks generally includes (i) the root neural network that was included in the current set of neural networks before a first stage of the plurality of stages, (ii) for each task for which the neural network system has been trained at respective preceding stages, a neural network with the highest performance score of all neural networks trained to perform the task, or (iii) both.

At the beginning of the stage, the system can perform a "second" selection procedure to select parents from the seed neural networks until certain criteria are satisfied.

Upon determining that the criteria are satisfied, the system can begin performing a "first" selection procedure to select parents from the active population.

For example, the system can determine that the certain criteria are satisfied in response to determining that one or more particular neural networks in the current set of neural networks have been trained to perform the active task, i.e., that the active population is non-empty because it includes at least one particular neural network from the current set.

As another example, the system can determine that the certain criteria are satisfied in response to determining that there are any neural networks that either (i) are in the current set and have been trained to perform the active task or (ii) have been trained previously during the stage to perform the active task, i.e., that the active population is non-empty because it includes at least one particular neural network from the current set or one candidate neural network has already been added to the active population during the stage.

As another example, the system can determine that the certain criteria are satisfied in response to determining that the seed set of neural networks is empty.

For example, to perform the second selection procedure, the system can select parents from the seed set by sampling uniformly at random without replacement, so that once a neural network is selected it is removed from the seed set. Thus, after all of the seed neural networks have been selected, the seed set will become empty.

As another example, the system can perform the second selection procedure by performing the first selection procedure described below, but on the neural networks in the seed set instead of on the neural networks in the active population.

To perform the first selection procedure, the system performs steps 302-306.

The system determines an ordering of the one or more particular neural networks, i.e., the one or more particular neural networks that are in the active population, according to the respective performance scores determined after training each of the one or more particular neural networks (step 302). That is, the system orders the particular neural networks in the active population (also referred to as a "pool") so that the neural networks with the highest performance scores are highest in the order.

Starting at an initial particular neural network in the ordering, the system evaluates one or more respective particular neural networks (step 304).

In particular, the system determines, according to a random sample, whether to select the particular neural network. That is, by sampling from a probability distribution.

Generally, each particular neural network can be associated with a probability of selection, i.e., can be selected with the associated probability when evaluated, with the probability being lower the more times the particular neural network has already been selected as a parent neural network in the current stage.

As a particular example, a particular neural network m can be selected with probability equal to or proportional to:

$$0.5^{\#selections(m,t)}$$

where #selections(m,t) identifies a number of times that particular neural network m has been selected as the parent neural network when training a candidate neural network to perform the active task in stage t. Thus, this biases the selection process towards high-performing particular neural networks that have been selected relatively few times as parents in the current stage.

In response to determining to select the particular neural network, the system ends the evaluation and uses the selected particular neural network as the parent.

In response to determining not to select the particular neural network, the system continues to evaluate the next particular neural network in the ordering.

If the system determines not to select a final neural network in the ordering, i.e., the system traverses all of the particular neural networks in the active population and determines not to select any of the neural networks, the system can select the parent neural network using a different technique (step 306).

In general, the system can select the parent neural network in any of a variety of ways.

For example, the system can select a neural network from the current set uniformly at random.

As another example, the system can select a neural network from a set that includes the active population and the current set uniformly at random.

As yet another example, the system can generate a second set of neural networks, e.g., that includes all of the neural networks in the current set that have been trained to perform a task that is different from the active task. The system can then perform steps 302 and 304 for the neural networks in the second set. If, after performing steps 302 and 304 for the neural networks in the second set, the system still has not selected a parent neural network, the system can, e.g., select a neural network from the current set uniformly at random.

As described above, once a parent is selected, the candidate neural network is generated and trained. Upon being trained, the candidate neural network is added to the active population. For example, the system can add each candidate neural network to the active population. As another example, the system can add a candidate neural network to the active population only if the performance score for the candidate neural network exceeds that of the parent that was selected for the candidate.

Figure 4:
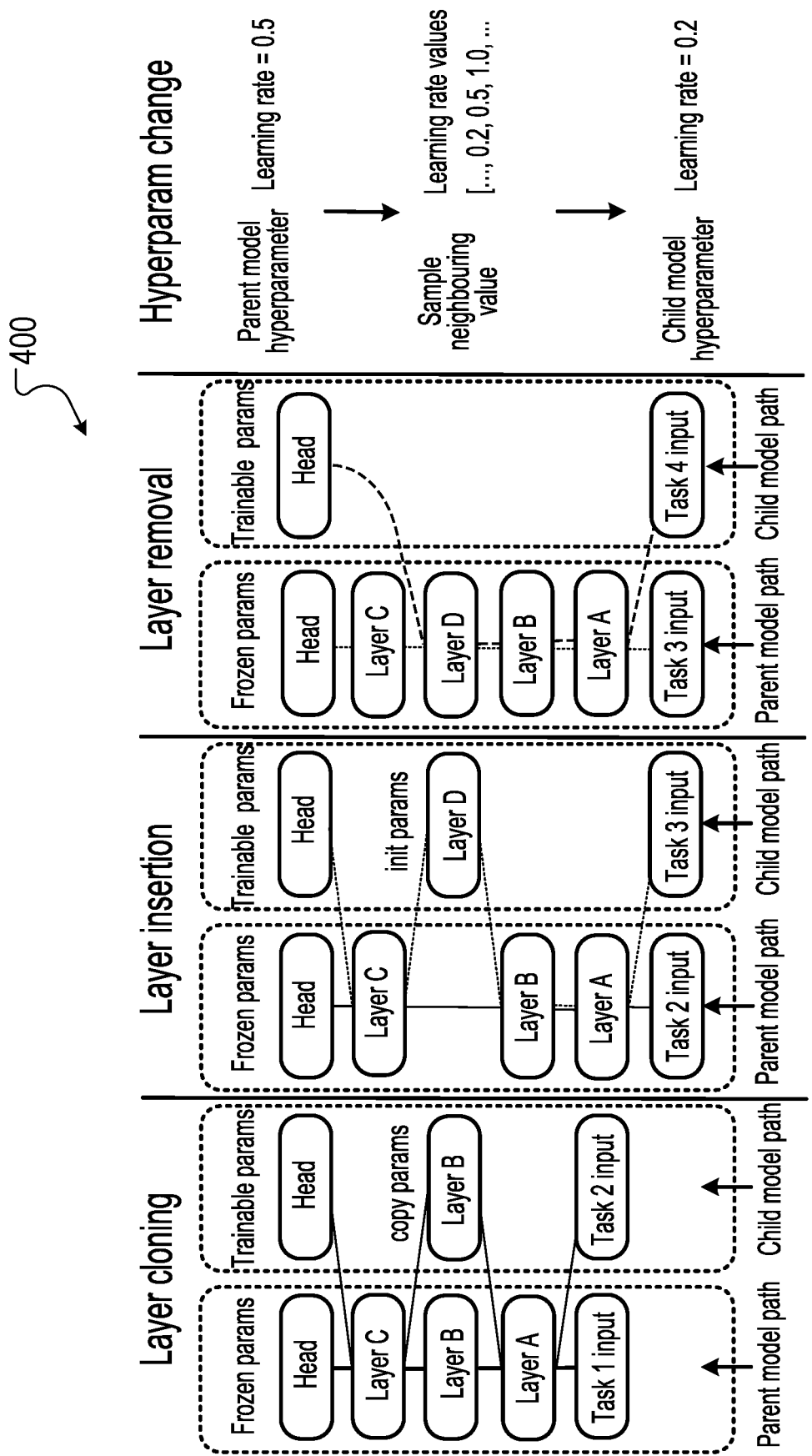
FIG. 4 shows an example of mutating a parent neural network.

FIG. 4 shows an example of mutating a parent neural network to generate a candidate neural network. As can be seen from FIG. 4, generating a candidate neural network is represented as generating a path that includes network blocks on a parent model path (that are frozen and cannot be trained) and network blocks on a child model path (that can be trained).

In the example of FIG. 4, four mutations are shown: layer cloning, layer insertion, layer removal, and hyperparameter ("hyperparam") change.

The layer cloning mutation refers to the mutation that selects the first strict subset of network blocks to be copied from the parent to the candidate neural network and that can be trained.

In the example of FIG. 4, the system has selected the "layer B" network block to be in the first strict subset.

As one example, to perform the layer cloning mutation, i.e., to generate the first strict subset, the system can, for each of some or all of the network blocks b of the parent neural network, select the network block for including in the first strict subset with probability $\mu_b$. That is, the system can independently determine to include each network block b in the first strict subset with probability $\mu_b$. In some implementations, the respective probability $\mu_b$ for each network block b is the same.

The layer insertion mutation refers to the mutation that adds one or more new network blocks to the candidate neural network that were not in the parent neural network.

In the example of FIG. 4, after training the model the Task 2 candidate neural network, the system uses the Task 2 candidate neural network as the parent neural network and mutates the Task 2 candidate neural network by adding a network block "Layer D" between Layer B and Layer C.

For example, the system can determine whether to add any new network blocks to a given candidate by, for each pair p of one or more pairs of consecutive network blocks of the parent neural network, determining to add a new network block between the corresponding pair of network blocks in the candidate neural network with probability $\mu_b$. In some implementations, the respective probability $\mu_b$ for each pair p of network blocks is the same.

Generally, the system inserts a new network block that processes inputs having the dimensionality of the outputs of the first block in the pair to generate outputs that preserve that dimensionality. As a particular example, the system can add residual adapter network blocks. One example of such a network block is sequence of two fully connected layers with variable inner dimension size. The Gelu non-linearity is applied on the inner representation and layer normalization is applied to the input of the fully connected layers. The second layer can be zero initialized, to guarantee that its insertion does not alter the parent model representation at the start of the child training.

The layer removal mutation refers to the mutation that identifies a third strict subset of the network blocks of the parent neural network to remove from the candidate neural network.

Again, the parent neural network remains constant during the training of the candidate neural network, so to "remove" a network block in the third strict subset from the candidate neural network, the system can add connections between the preceding network block in the candidate neural network and the following network block in the candidate neural network (i.e., connections by which block outputs of the preceding network block will be provided as block inputs to the following network block).

This can be seen from the example of FIG. 4, where layer C of the Task 3 parent neural network is not in the path for the Task 4 candidate neural network, so that there is a connection between Layer D and the output head network block for the Task 4 candidate neural network.

For example, the system can perform this mutation by for each of one or more network blocks b of the parent neural network, selecting the network block for inclusion in the third strict subset with probability $\mu_b'$. In some cases, to avoid the knowledge and representation disruption that would result from removing internal layers, the one or more network blocks that can be removed include only the last network block in the parent neural network that immediately precedes the output head network block.

The hyperparameter mutation adjusts the hyperparameters of the parent neural network and uses the adjusted hyperparameters to train the candidate neural network.

In particular, when the hyperparameter mutation is used, the system maintains, for each neural network in the current set, data identifying respective values for a set of one or more hyperparameters used during the training of the neural network.

Then, prior to training the candidate neural network, the system can identify a subset of the set of hyperparameters that were used to train the parent neural network.

For each hyperparameter not in the identified subset, the system determines to train the candidate neural network using the same value for the hyperparameter as was used to train the parent neural network.

For each hyperparameter in the identified subset, the system can select a new value for the hyperparameter for training the candidate neural network.

To identify the subset of the set of hyperparameters, the system can, for each of one or more hyperparameters h, select the hyperparameter for inclusion in the subset with probability $\mu_h$. In some implementations, the respective probability $\mu_h$ for each hyperparameter h is the same.

To select the new value for the hyperparameter for training the candidate neural network, the system can identify an ordering of a finite set of possible values for the hyperparameter and then identify, in the ordering, the particular value used during training of the parent neural network.

The system can then select a neighboring value that neighbors the particular value in the ordering. That is, the system can select either (i) the value directly preceding the particular value used during training of the parent neural network in the ordering or (ii) the value directly following the particular value used during training of the parent neural network in the ordering.

In the example of FIG. 4, the system has selected to modify the learning rate hyperparameter, which was previously set to 0.5. The system then selects, e.g., uniformly at random, one of the two neighboring values to 0.5 in the ordered list of values for the learning rate, resulting in a selection of the new value 0.2.

Figure 5:
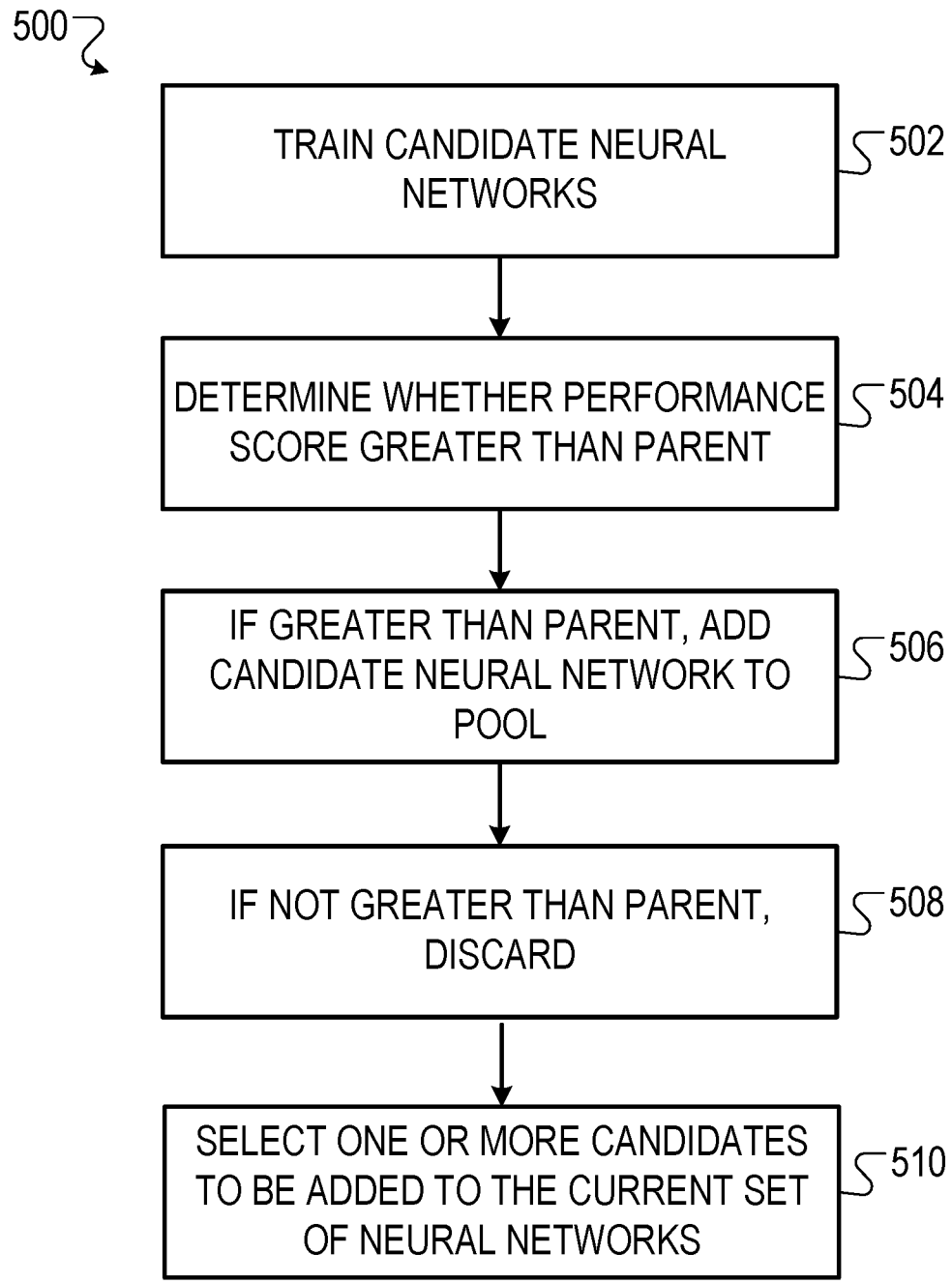
FIG. 5 shows an example of performing a sequence of generations during a given training stage.

FIG. 5 is a flow diagram of an example process 500 for performing a sequence of generations during a given training stage. For convenience, the process 500 will be described as being performed by a system of one or more computers located in one or more locations. For example, a multi-task training system, e.g., the multi-task training system 100 of FIG. 1, appropriately programmed, can perform the process 500.

In particular, the system can perform steps 502-508 of the process 500 for each generation in the sequence of generations in order to perform the training stage. Generally, the sequence will have a fixed number of generations, e.g., that can be received as input by the system or can be determined by the system based on how many computational resources are available to the system when the training stage begins.

The system trains a plurality of candidate neural networks to perform the active task (step 502). For example, the system can train each candidate neural network in parallel by dedicating one or more hardware accelerators to the training of the candidate neural network.

For each candidate neural network, the system determines whether the performance score for the candidate neural network is greater than the performance score generated for the corresponding parent neural network during training of the neural network (step 504). The performance score for the parent neural network and the candidate neural network can be computed as described above with reference to FIG. 2.

For each candidate neural network, if the performance score for the candidate neural network is greater than the performance score generated for the corresponding parent neural network, the system adds the candidate neural network to a pool of possible parent neural networks for any subsequent generation in the sequence of generations (the "active population") (step 506).

For each candidate neural network, if the performance score for the candidate neural network is not greater than the performance score generated for the corresponding parent neural network, the system discards the candidate neural network (step 508). Thus, parent neural networks for subsequent generations can only be selected from candidate neural networks that were not discarded, i.e., only from candidate neural networks that scored better than their parents.

After performing the sequence of generations, the system selects the one or more candidate neural networks to be added to the current set from the candidate neural networks generated at respective generations that were not discarded (step 510), e.g., as described above with reference to FIG. 2.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework or a Jax framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of performing a particular machine learning task using a trained neural network system, the method comprising:

receiving a network input for the machine learning task, and processing the network input for the machine learning task using a particular neural network of the trained neural network system that is configured to perform the machine learning task, wherein the neural network comprises a respective set of network blocks, and the neural network shares at least one respective network block with one or more other neural networks of the trained neural network system that have been trained jointly with the particular neural network, the joint training comprising:

selecting a parent neural network from the one or more other neural networks that share at least one respective network block with the particular neural network;

identifying a first strict subset of the network blocks of the parent neural network, identifying a second strict subset of the network blocks of the parent neural network that are to be shared between the parent neural network and the particular neural network;

initializing the particular neural network, comprising, for each network block in the first strict subset, generating a copy of the network block for inclusion in the particular neural network; and generating trained values for a plurality of network parameters of the particular neural network using training data corresponding to the particular task, comprising training the particular neural network on the training data corresponding to the particular task to update a respective plurality of parameters of each of the copied network blocks that were copied from the parent neural network while holding the shared network blocks that are shared between the parent neural network and the particular neural network fixed.

2. The method of claim 1, wherein selecting a parent neural network from the one or more other neural networks that share at least one respective network block with the particular neural network comprises in response to determining that one or more criteria are satisfied, performing a first selection procedure, wherein performing the first selection procedure comprises:

determining an ordering of the one or more other neural networks that share at least one respective network block with the particular neural network according to respective performance scores determined during training of the one or more other neural networks that share at least one respective network block with the particular neural network, wherein the one or more other neural networks that share at least one respective network block with the particular neural network have already been trained to perform the particular task; and starting at an initial neural network in the ordering, evaluating one or more respective neural networks, comprising:

determining, according to a random sample, whether to select the neural network;

in response to determining to select the neural network, ending the evaluation; and in response to determining not to select the neural network, continuing to evaluate the next neural network in the order.

3. The method of claim 2, wherein performing the first selection procedure further comprises, in response to determining not to select a final neural network in the ordering:
selecting the parent neural network from a set of neural networks that comprises one or more neural networks from the one or more other neural networks that share at least one respective network block with the particular neural network that have been trained to perform a task that is different from the particular task.

4. The method of claim 1, wherein identifying the first strict subset of the network blocks of the parent neural network comprises:
for each of one or more network blocks b of the parent neural network, selecting the network block for inclusion in the first strict subset with probability $\mu_b$.

5. The method of claim 1, wherein
the joint training further comprises:
identifying a third strict subset of the network blocks of the parent neural network that are not to be included in the particular neural network; and
initializing the particular neural network further comprises, for each particular network block in the third strict subset:
adding a connection between (i) a network block of the particular neural network corresponding to a network block of the parent neural network that precedes the particular network block in the parent neural network and (ii) a network block of the particular neural network corresponding to a network block of the parent neural network that follows the particular network block in the parent neural network.

6. The method of claim 5, wherein each network block of the parent neural network that is not in the first strict subset or the third strict subset is in the second strict subset.

7. The method of claim 5, wherein identifying the third strict subset of the network blocks of the parent neural network comprises:
for each of one or more network blocks b of the parent neural network, selecting the network block for inclusion in the third strict subset with probability $\mu'_b$.

8. The method of claim 1, wherein initializing the particular neural network further comprises:
adding one or more new network blocks to the particular neural network that are not in the parent neural network.

9. The method of claim 8, wherein adding one or more new network blocks to the particular neural network comprises:
for each pair p of one or more pairs of consecutive network blocks of the parent neural network, determining to add a new network block between a corresponding pair of network blocks in the particular neural network with probability $\mu_p$.

10. A system comprising one or more computers and one or more storage devices storing instructions that when executed by the one or more computers cause the one or more computers to perform operations for performing a particular machine learning task using a trained neural network system, the operations comprising:
receiving a network input for the machine learning task, and
processing the network input for the machine learning task using a particular neural network of the trained neural network system that is configured to perform the machine learning task, wherein the neural network comprises a respective set of network blocks, and the neural network shares at least one respective network block with one or more other neural networks of the trained neural network system that have been trained jointly with the particular neural network, the joint training comprising:
selecting a parent neural network from the one or more other neural networks that share at least one respective network block with the particular neural network;
identifying a first strict subset of the network blocks of the parent neural network,
identifying a second strict subset of the network blocks of the parent neural network that are to be shared between the parent neural network and the particular neural network;
initializing the particular neural network, comprising, for each network block in the first strict subset, generating a copy of the network block for inclusion in the particular neural network; and
generating trained values for a plurality of network parameters of the particular neural network using training data corresponding to the particular task, comprising training the particular neural network on the training data corresponding to the particular task to update a respective plurality of parameters of each of the copied network blocks that were copied from the parent neural network while holding the shared network blocks that are shared between the parent neural network and the particular neural network fixed.

11. The system of claim 10, wherein selecting a parent neural network from the one or more other neural networks that share at least one respective network block with the particular neural network comprises in response to determining that one or more criteria are satisfied, performing a first selection procedure, wherein performing the first selection procedure comprises:
determining an ordering of the one or more other neural networks that share at least one respective network block with the particular neural network according to the respective performance scores determined during training of the one or more other neural networks that share at least one respective network block with the particular neural network, wherein the one or more other neural networks that share at least one respective network block with the particular neural network have already been trained to perform the particular task; and
starting at an initial neural network in the ordering, evaluating one or more respective neural networks, comprising:
determining, according to a random sample, whether to select the neural network;
in response to determining to select the neural network, ending the evaluation; and
in response to determining not to select the neural network, continuing to evaluate the next neural network in the order.

12. The system of claim 11, wherein performing the first selection procedure further comprises, in response to determining not to select a final neural network in the ordering:
selecting the parent neural network from a set of neural networks that comprises one or more neural networks from the one or more other neural networks that share at least one respective network block with the particular neural network that have been trained to perform a task that is different from the particular task.

13. The system of claim 10, wherein identifying the first strict subset of the network blocks of the parent neural network comprises:
  for each of one or more network blocks b of the parent neural network, selecting the network block for inclusion in the first strict subset with probability $\mu_b$.

14. The system of claim 10, wherein
  the joint training further comprises:
    identifying a third strict subset of the network blocks of the parent neural network that are not to be included in the particular neural network; and
    initializing the particular neural network further comprises, for each particular network block in the third strict subset:
      adding a connection between (i) a network block of the particular neural network corresponding to a network block of the parent neural network that precedes the particular network block in the parent neural network and (ii) a network block of the particular neural network corresponding to a network block of the parent neural network that follows the particular network block in the parent neural network.

15. The system of claim 14, wherein each network block of the parent neural network that is not in the first strict subset or the third strict subset is in the second strict subset.

16. The system of claim 14, wherein identifying the third strict subset of the network blocks of the parent neural network comprises:
  for each of one or more network blocks b of the parent neural network, selecting the network block for inclusion in the third strict subset with probability $\mu'_b$.

17. The system of claim 10, wherein initializing the particular neural network further comprises:
  adding one or more new network blocks to the particular neural network that are not in the parent neural network.

18. The system of claim 17, wherein adding one or more new network blocks to the particular neural network comprises:
  for each pair p of one or more pairs of consecutive network blocks of the parent neural network, determining to add a new network block between a corresponding pair of network blocks in the particular neural network with probability $\mu_p$.

19. One or more non-transitory computer-readable storage media storing instructions that when executed by one or more computers cause the one more computers to perform operations for training a neural network system to perform a plurality of different machine learning tasks,
  receiving a network input for the machine learning task, and
  processing the network input for the machine learning task using a particular neural network of the trained neural network system that is configured to perform the machine learning task, wherein the neural network comprises a respective set of network blocks, and
    the neural network shares at least one respective network block with one or more other neural networks of the trained neural network system that have been trained jointly with the particular neural network, the joint training comprising:
      selecting a parent neural network from the one or more other neural networks that share at least one respective network block with the particular neural network;
      identifying a first strict subset of the network blocks of the parent neural network,
      identifying a second strict subset of the network blocks of the parent neural network that are to be shared between the parent neural network and the particular neural network;
      initializing the particular neural network, comprising, for each network block in the first strict subset, generating a copy of the network block for inclusion in the particular neural network; and
      generating trained values for a plurality of network parameters of the particular neural network using training data corresponding to the particular task, comprising training the particular neural network on the training data corresponding to the particular task to update a respective plurality of parameters of each of the copied network blocks that were copied from the parent neural network while holding the shared network blocks that are shared between the parent neural network and the particular neural network fixed.

20. The one or more non-transitory computer-readable storage media of claim 19, wherein selecting a parent neural network from the one or more other neural networks that share at least one respective network block with the particular neural network comprises in response to determining that one or more criteria are satisfied, performing a first selection procedure, wherein performing the first selection procedure comprises:
  determining an ordering of the one or more other neural networks that share at least one respective network block with the particular neural network according to the respective performance scores determined during training of the one or more other neural networks that share at least one respective network block with the particular neural network, wherein the one or more other neural networks that share at least one respective network block with the particular neural network have already been trained to perform the particular task; and
  starting at an initial neural network in the ordering, evaluating one or more respective neural networks, comprising:
    determining, according to a random sample, whether to select the neural network;
    in response to determining to select the neural network, ending the evaluation; and
    in response to determining not to select the neural network, continuing to evaluate the next neural network in the order.

* * * * *